(12) United States Patent  
Charcranoon (10) Patent No.: US 7,286,482 B2
(45) Date of Patent: Oct. 23, 2007

(54) DECENTRALIZED SLS MONITORING IN A DIFFERENTIATED SERVICE ENVIRONMENT

(75) Inventor: Saravut Charcranoon, Richardson, TX (US)

(73) Assignee: Alcatel Lucent, Paris (FR)

( * ) Notice: Subject to any disclaimer, the term of this patent is extended or adjusted under 35 U.S.C. 154(b) by 1085 days.

(21) Appl. No.: 10/307,182

(22) Filed: Nov. 29, 2002

(65) Prior Publication Data

US 2004/0105392 A1 Jun. 3, 2004

(51) Int. Cl.
*H04L 12/24* (2006.01)
*H04L 12/26* (2006.01)
*G01R 31/08* (2006.01)

(52) U.S. Cl. .................. 370/251; 370/229; 370/252; 709/224

(58) Field of Classification Search ........ 370/229–235, 370/241–253, 351–389, 395–401; 709/223–225, 709/232–241
See application file for complete search history.

(56) References Cited

U.S. PATENT DOCUMENTS

| 5,764,626 | A | 6/1998 | VanDervort |
| 5,793,976 | A * | 8/1998 | Chen et al. ................. 709/224 |
| 6,112,236 | A | 8/2000 | Dollin et al. |
| 6,408,335 | B1 * | 6/2002 | Schwaller et al. ........... 709/224 |
| 6,430,160 | B1 | 8/2002 | Smith et al. |
| 6,556,540 | B1 * | 4/2003 | Mawhinney et al. ........ 370/229 |
| 6,625,648 | B1 * | 9/2003 | Schwaller et al. ........... 709/224 |
| 6,785,237 | B1 * | 8/2004 | Sufleta ........................ 370/236 |
| 6,868,094 | B1 * | 3/2005 | Bordonaro et al. .......... 370/516 |
| 6,944,128 | B2 * | 9/2005 | Nichols ........................ 370/235 |
| 6,968,374 | B2 * | 11/2005 | Lemieux et al. ............. 709/223 |
| 7,106,718 | B2 * | 9/2006 | Oyama et al. ............... 370/340 |
| 7,161,942 | B2 * | 1/2007 | Chen et al. .................. 370/392 |
| 2003/0189930 | A1 * | 10/2003 | Terrell et al. ................ 370/389 |
| 2004/0064555 | A1 * | 4/2004 | Cuny et al. .................. 709/225 |
| 2006/0077902 | A1 * | 4/2006 | Kannan et al. .............. 370/250 |

FOREIGN PATENT DOCUMENTS

| CA | 2200008 | 9/1998 |
| EP | 1206085 A | 5/1998 |
| GB | 2 342 527 A | 4/2000 |
| GB | 2 355 901 A | 5/2001 |
| JP | 2000-196593 | 7/2000 |
| JP | 2001-053792 | 2/2001 |
| JP | 2001-069146 | 3/2001 |
| JP | 2001-127795 | 5/2001 |

(Continued)

OTHER PUBLICATIONS

Hofmann, et al.; One-Way-Delay Measurements with CM Toolset; IPCCC 2000; pp. 41-47.

(Continued)

*Primary Examiner*—Man U. Phan
(74) *Attorney, Agent, or Firm*—Craig A. Hoersten; Jessica W. Smith (57) ABSTRACT

A decentralized SLS monitoring structure (30) includes a measurement preparation and minimization module (32), measurement launching coordination module (34), measurement scheduler module (36) and measurement initialization module (38). A configuration server (40) provides information regarding the test parameters for a given test and an SLS Objects database (42) provides information on the SLS specification for a given SLA (service level agreement).

14 Claims, 6 Drawing Sheets

FOREIGN PATENT DOCUMENTS

JP  2001-148710  5/2001
WO  WO 01/20825 A1  3/2001

OTHER PUBLICATIONS

Kata, et al.; Active Measurement and Analysis of Delay Time in the Internet; Waseda University, Apr. 1, 1999.

Black, et al.; Per Hop Behavior Identification Codes; IETF Network Working Group; RFC 3140; Jun. 2001.

Nichols, et al.; Definition of the Differentiated Services Field (DS Field) in the IPv4 and IPv6 Headers; IETF Network Working Group; RFC 2474; Dec. 1998.

* cited by examiner

| Performance Metric<br><br>Service Group | Throughput | Delay | Delay Variation | Packet Loss | Notes |
|---|---|---|---|---|---|
| EF-like service | Per SLS | Per SLS<br>Per SLS*<br>None | Per SLS<br>Per SLS*<br>None | Per SLS*,<br>None | * w/ less stringent. |
| AF-like service | None<br>Per SLS** | Per Service<br>Per SLS** | None | Per Service | ** if value specified |

| Test No. | SLS No. | Aggregate Level | | Egress Node | Service Schedule | Launching Schedule | Test Packet Specification | No. of Launches |
|---|---|---|---|---|---|---|---|---|
| | | Per AF/ AF No. | Per SLS/ SLS No. | | | | | |
| 1 | 1 | | | | | | | |
| 2 | 2 | | | | | | | |
| 3 | 2 | | | | | | | |
| : | : | | | | | | | |
| M | N | | | | | | | |

| EGRESS | AF 1 | AF 2 | AF 3 | ... | EF-like Service | | |
|---|---|---|---|---|---|---|---|
| | | | | | SLS 1 | SLS 2 | ... |
| A | | (a,b,c) | | | (a,b,c*) | | |
| B | | | | | | | |
| C | | | | | | | |
| : | | | | | | | |

| Legend |
|---|
| a: a test configuration |
| b: a test packet specification |
| c: a set of service schedules |
| c*: a service schedule |

DECENTRALIZED SLS MONITORING IN A DIFFERENTIATED SERVICE ENVIRONMENT

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to service level specification (SLS) monitoring in Differentiated Service Networks.

2. Description of the Related Art

A Differentiated Service (DiffServ) network provides differentiated classes of service for Internet traffic, support various types of applications, and specific business requirements, as opposed to common Internet access, where there are no guarantees of specific performance. A service level specification (SLS) defines the parameters of services required from a Differentiated Service network. The SLS could specify, for example, maximum delays, delay variations and packet losses.

Monitoring actual conditions in a network involves a large number of measurement activities. Prior art solutions use different platforms for each test. Using multiple platforms is a complex and expensive solution.

Therefore, a need has arisen for a less costly and complex method and architecture for SLS monitoring in a differentiated service network.

BRIEF SUMMARY OF THE INVENTION

In the present invention, a measurement system for measuring service level specification (SLS) performance criteria between a plurality of ingress and egress nodes comprises a central structure for generating test parameters for a plurality of tests between ingress and egress node pairs and for passing the test parameters to the node pairs for execution on the node pairs without intervention of said central structure.

Accordingly, the execution of the measurements is decentralized; the central structure only needs to get involved if changes are made to the tests. Further, the preparation and initiation of multiple tests (delay, delay variation, packet loss) can be handled by a single structure, rather than each being performed by a separate structure. The measurement activities are minimized while achieving effective and efficient measurements.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-11 of the drawings, like numerals being used for like elements of the various drawings.

Figure 1:
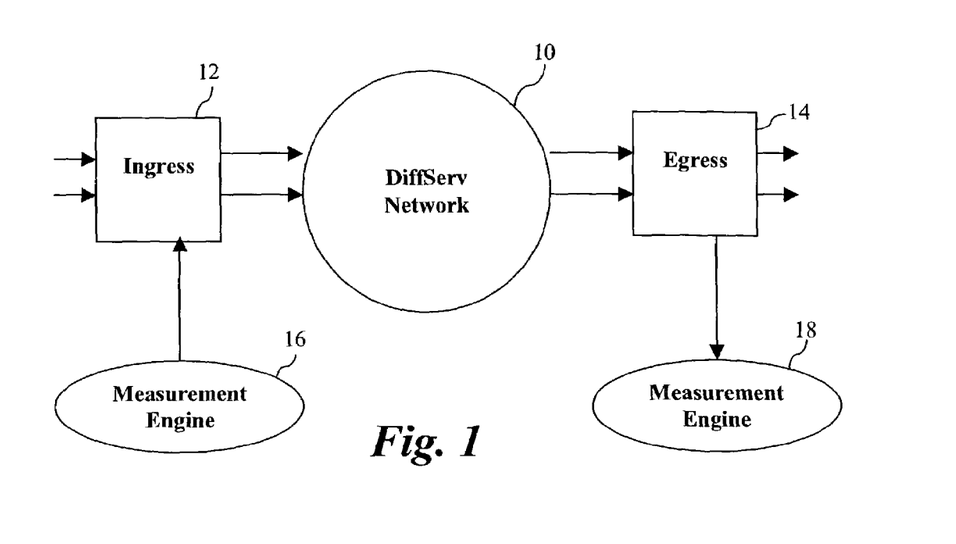
FIG. 1 illustrates a basic block diagram of a structure of unified one-way network performance measurement system.

FIG. 1 illustrates a basic block diagram of a structure of unified one-way network performance measurement. A DiffServ network 10 has one or more ingress nodes 12 and one or more egress nodes 14. Ingress nodes 12 and egress nodes 14 are the interfaces between the DiffServ network 10 and outside data networks or data sources. A packet passing through the DiffServ network 10 from an external data source must enter via an ingress node 12; similarly, a packet from within the DiffServ network 10 addressed to a destination outside of the DiffServ network 10 must exit via an egress node 14. An ingress measurement engine 16 is coupled to the ingress node 12 and an egress measurement engine 18 is coupled to the egress node 14.

In the preferred embodiment, the measurement nodes 16 and 18 monitor at least three types of network performance measurements: one-way delay, one-way delay variation, and one-way packet loss. The three measurements are performed using a single stream of test packets. The following terms are used herein:

singleton instance—an atomic instance obtained from a single measurement or a single observation of the network;

sample—a set of related singleton instances. The size of the sample, i.e., a number of singleton instances, is randomly determined by pre-assigned random distribution function, for example, a Poisson distribution. The time period to perform measurement in order to produce each sample is defined by the session time. The time between each sample measurement is specified by the inter-session time; and statistics metric—derived either as per sample or per performance metric. The per-sample statistics is computed from the related set of singleton instances, while the per-performance metric statistics is calculated from the set of sample statistics.

Pseudo-code for a common measurement procedure, i.e. a measurement procedure for all three performance measurements is given below:

Step 0: Prepare the ingress and egress nodes to send and receive a test packet, e.g., synchronize clock between the two nodes.

For the $i^{th}$ Test:

Step 1: Generate a sequence of time index from a Poisson point process with three parameters [λ(i), starting_time(i), stopping_time(i)] where i is the test number. For a Poisson random distribution, a Poisson pseudo random number is generated, only the value falling between [starting_time(i), stopping_time(i)] is selected to form the sequence of time index This sequence of index will be used to initiate test packets.

Repeat

Step 2: At the ingress node (behaving as a source node), schedule a new test packet if the System_Current_time coincides with the time index in the sequence generated in step 1.

Step 3: Form a test packet with an appropriate header as well as a set of specific information (see below)

Step 4: Place timestamp and a test packet sequence number in the test packet payload as well as other information (see below)

Step 5: Send the test packet towards the egress node.

Step 6: At the egress node upon receiving a test packet in a reasonable period of time (to be specified as a cut-off time threshold τ), place a timestamp on the packet as soon as possible.

Step 7: If the test packet fails to arrive within a time threshold (after a cut-off time threshold $\tau_{Delay}$ or $\tau_{Loss}$), the test packet will be taken as an infinite/undefined delay packet or a lost packet.

Until System_Current_time≧Stopping_Time(i)

Step 8: While (System_Current_time<Stopping_time(i)+Inter-session_time(i)) Do waiting, Until (System_Current_time>Stopping_time(i)+Inter-session_time(i)), then set i to i+1, and go to step 1.

The specifics for the common test procedure set forth above vary upon the measurement being performed. For a one-way delay measurement, OW_Delay($P_i$) is a one-way delay singleton of a successfully received test packet i. $T_{ingress}$ and $T_{egress}$ are the sending wire time (time a packet is put on a link) at the ingress node and the receiving wire time (time a packet is taken from a link) at the egress node, respectively. $TS_{ingress}$ and $TS_{egress}$ are the stamping times of a test packet at an ingress and an egress nodes, respectively. The cut-off time threshold ($\tau_{Delay}$) must be specified. The test packet with $TS_{egress}>TS_{ingress}+T_{Delay}$ is considered to have an infinite or undefined one-way delay. When a wire time is a stamping time, a one-way delay singleton is computed by subtracting the egress timestamp from the ingress timestamp: OW_Delay($P_i$)=$T_{egress}-T_{ingress}=TS_{egress}-TS_{ingress}$. If the test packet is taken as a lost packet, the resulted one-way delay is undefined or set to infinite (OW_Delay($P_{lost}$)=∞). If there is any delay incurred between stamping time and sending or receiving wire time, the expression given above for OW_Delay($P_i$) must be modified as OW_Delay($P_i$)=$T_{egress}-T_{ingress}$=($TS_{egress}$-RD)-($TS_{ingress}$+SD), where SD and RD are delays between a stamping time and a sending wire time, and a stamping time and a receiving wire time, respectively.

Any errors and uncertainties related to clocks such as synchronization and resolution. For example, if an ingress clock is ahead of an egress clock by Tsync, then the correct one-way delay is ($TS_{egress}-TS_{ingress}$)+Tsync. If the clock resolutions at the ingress and egress nodes are $CkRes_{ingress}$ and $CkRes_{egress}$, then the one-way delay will be given as OW_Delay($P_i$)±($CkRes_{ingress}+CkRes_{egress}$). Any other errors would be included if they can be identified, e.g., a systematic error and a random error. The one-way delay sample is a sequence of one-way delay singletons measured during a period of one session. It should be noted that all the singletons will have almost the same packet specification. In case of multiple duplicated non-corrupt copies received, the one-way delay of the first copy determines the packet one-way delay value.

For a one-way delay variation measurement, interval with endpoints $l_1$ and $l_2$ are set on the one-way delay packet stream. A function that unambiguously defines the two packets from the above stream is used for the singleton measurement. Examples of such a function include one that selects any two specific packets in the interval $[l_1, l_2]$ of the stream, one that chooses two consecutive packets in the interval $[l_1, l_2]$ with minimum and maximum one-way delays, and a consecutive two packets in the interval $[l_1, l_2]$. The one-way delay variation is then derived from the one-way delay metric of those selected packets. It could be computed after the one-way delay measurement is complete.

If the egress did not receive any of the two specified test packets, then the one-way delay variation is undefined. The issue of error and uncertainty due to the clock and the host is generally treated similarly to the one-way delay measurement. The delay variation statistics is estimated based on the selected packet pairs that successfully arrive at the egress node, i.e. within a delay cut-off time threshold.

For the one-way packet loss measurement, a cut-off time threshold ($\tau_{Loss}$) must be specified. The test packet with $TS_{egress}>TS_{ingress}+\tau_{Loss}$ is considered to be a lost packet. If the ingress clock is ahead of the egress by Tsync, then $TS_{egress}+Tsync>TS_{ingress}+\tau_{Loss}$. A corrupted received test packet is taken as a lost packet. A duplicated non-corrupted test packet is considered a received test packet. A fragmented and unable-to-reassembled is taken as a lost packet. A packet dropped by a measurement engine due to resource limit is counted as a lost packet. If the test packet was considered as a lost packet then the associate packet loss value (L) of the singleton would be set to one, otherwise it would be set zero. The singleton result is an ordered pair of the wire time the first bit of test packet sent at the ingress node ($WT_{Ingress}$) and the result loss value (L), i.e., <$WT_{ingress}$, L>. A set of test packet sending wire times, $WT_{Ingress}$, will be reported to the control entity, such as a data collector element. Together with the result report from the egress, they are able to correlate the data and produce such the ordered pairs. Given a sample of the OW packet loss singletons (i.e., a set of the ordered pairs), the average of all the result value is computed and serves as an average packet loss.

The test generating rate (λ), can be per-DSCP or per-SLS. In a simple aggregation-based rate which is per-DSCP, test packets are generated according to a Poisson distribution with parameter λ, a rate of generated test packets. For each ingress node, one stream of test packets is generated per aggregate level, i.e., per AF. The aggregated rate of generated packets, $\lambda_{DSCP}$, is determined by adding all the constituent generating rates, the $\lambda_{SLS}$. That is, $$\lambda_{DSCP} = \sum_j \lambda_{SLS},$$

where: $\lambda_{DSCP}$ is an aggregated rate of DSCP and $\lambda_{SLS}^j$ is an individual rate of the $j^{th}$ SLS of the DSCP.

For a traffic description proportion-based generating rate that is per-DSCP, given the aggregate traffic descriptor ($\sigma_{DSCP}, \rho_{DSCP}$), where $\sigma_{DSCP}$ is a token bucket size allowance and $\rho_{DSCP}$ is a token rate allowance for this DSCP, and the session time S, the aggregate rate can be computed based on the proportion of the total number of incoming packets for the session time period:

$$\lambda_{DSCP} = \kappa \left( \frac{\sigma_{DSCP}}{S} + \rho_{DSCP} \right),$$

where K is a ratio of test traffic and real (or user) traffic.

The DSCP Specific packet frequency-based rate generates one test packet for every N user DSCP specific packets.

In a DSCP metric baseline-based rate, the baseline-based rate is determined directly from the DSCP baseline metric performance profile. This is a rather semi-static generating rate (it is semi-static since the rate(s) will change as a new profile is obtained). Depending on how frequent or how wide of the fluctuation of the metric in the profile, the baseline-based rate may be adjusted and thus different at various periods of the profile time scale.

Switching to a per SLS rate ($\lambda_{SLS}$), in a traffic descriptor-based rate, the parameter $\lambda_{SLS}$ should be proportional to its traffic descriptor ($\sigma, \rho$). Thus the relationship can be described as: $\lambda_{SLS} = (a\rho + b\sigma)$, where $\sigma$ is a token bucket size and $\rho$ is a token rate. For a long-term parameter it can be assumed that b is approximately zero, and a may be a small percentage, probably less than 10%. The value of a may change dynamically to reflect the current network load.

In case of a high bandwidth-delay product (BD) network, the $\lambda_{SLS}$ would increase correspondingly. That is, $\lambda_{SLS} = \kappa$ (BD), where $\kappa$ is a proportional parameter. This approach is particularly useful for a packet loss measurement. Assuming that a typical average packet loss is X %, thus $\kappa \geq X/100$.

For an SLS Output Profile based Rate, the $\lambda_{SLS}$ adapts to the delay, jitter, or packet loss output profile of the underlying metric. The more fluctuation of the metric profile, the higher the value of the per-SLS rate. If the packet loss exhibits a temporal dependence, it warrants for a higher rate.

For an SLS Metric Baseline-base rate, a measurement similar to the DSCP rate is taken, but it depends upon the SLS baseline profile. In an SLS metric baseline-based rate, the baseline-based rate is determined directly from the SLS baseline metric performance profile. This is a rather semi-static generating rate (it is semi-static since the rate(s) will change as a new profile is obtained). Depending on how frequent or how wide of the fluctuation of the metric in the profile, the baseline-based rate may be adjusted and thus different at various periods of the profile time scale.

The session time (Session_time) can be static, traffic count-based or randomly distributed. A static session time is deterministic and fixed. It can be specified as, for example, thirty seconds, a minute, or five minutes per session. It can also be derived from an aggregated specification, e.g., 30 sessions of all DSCP per hour. In this later case, an order of DSCP session may be required, and the inter-session time is implicitly defined.

In a traffic count-based session time, the session continues until a specified number of test packets have been generated. That is a session time is defined through a number of test packets generated. This number may be determined by taking a small percentage of a DSCP traffic descriptor ($\sigma_{DSCP}, \rho_{DSCP}$) or by considering from the DSCP delay, delay variation, or packet loss profile. If a delay profile shows a wide fluctuation or frequent abrupt changes in the recent time period, a high number of test packets will be generated. If a packet loss profile shows a temporal dependence, then more test packets will be generated.

In a random distribution-based session time, the session time is random and is determined according to a random distribution. Primarily, two random distributions are anticipated: a uniform and a exponential distribution. The uniform distribution generates the time from the [min, max] interval, where min and max are the distribution parameters. The exponential distribution gives a random session time with an average of $\mu_S$ time units. Additionally, the random distribution may be drawn from the empirical traffic characterization such as a heavy-tailed distribution of the traffic.

The inter-session time (Inter-session_time) can also be static or random. A static inter-session time is fixed between measurement sessions, while a random distribution-based inter-session time is determined from a certain random distribution, for example, a uniform and an exponential distribution. An inter-session time can be generated from the uniform distribution over [0, Max]. An exponential distribution provides a random time interval with an average of $\mu_I$.

Figure 2:
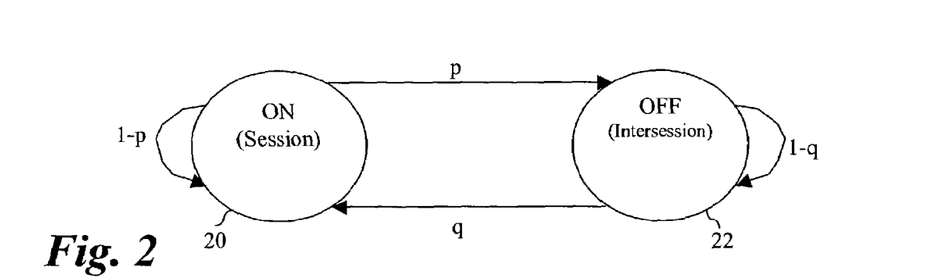
FIG. 2 illustrates the relationship between the session time and the intersession time.

The relationship between the session time and the intersession time is shown in FIG. 2. While in the on state 20, the measurement is launched for a session time period that is determined from several alternatives discussed above (static, traffic-count based, or random). Once the session time is expired, the process will either, with probability p, move to the off state or stay in the on state and re-launch the measurement for another session time period. In case that it moves, it will stay idle in the off state 22 for an inter-session time period that can be described by any of the alternatives discussed above (static or random). It then either, with probability q, moves back to the on state or stays in the off state for another inter-session time period. If p and q are set to one and the time period on each state is a static one, then there is a deterministic alternate on-off launching schedule. On the other hand, if the time period is randomly distributed, then there is a stochastic alternate on-off process. This model is useful in designing an experiment to detect loss patterns. For the generic one where p and q can assume any value between zero and one and time spent in each state is randomly distributed, then there is a two-state semi-Markov chain.

As mentioned above, the procedure to monitor delay, delay variation, and packet loss requires a cut-off parameter in order to determine the value of a test packet. For example, the test packet that has a receiving timestamp greater than the sending timestamp plus the cut-off threshold value is to be considered undefined or infinite one-way delay. There are two types of the cut-off threshold: the delay cut-off threshold ($\tau_{Delay}$) and packet loss cut-off threshold ($\tau_{Loss}$). They can be set to the same value, or they can be set to different values. The cut-off threshold should be set to a multiple of either a one-way delay or a round-trip time. These parameters may be a static or dynamic. For static parameters, a baseline one-way delay profile or round-trip time may be used to derive such parameters, while for a dynamic parameters, a value inferred from the one-way delay or round-trip time profile may be employed. Note that the packet loss threshold should not be too low otherwise it will be sensitive to various kinds of clock errors, such as those seen in the case of one-way delay.

It must be noted that the cut-off threshold is a per-ingress/egress path parameter. If there were multiple paths between the ingress and egress pair, then there would also be multiple cut-off thresholds. Thus at the egress, there are a number of cut-off parameters depending upon the number of ingress nodes and paths.

Table 1 describes information needed for identifying each packet.

TABLE 1

MEASUREMENT ID

| | |
|---|---|
| Ingress/ Egress Addresses | The ingress and egress addresses are required not only for routing purpose but also as the flow identification for later processing. In the SLS monitoring context, the information beyond the network layer, such as port number or an interface number, seems to be irrelevant unless a specific need is identified. |
| DSCP/PHB Number | The DSCP/PHB number is needed particularly when a measurement is performed per DSCP or PHB, e.g., the delay or packet loss measurement of the AF traffic. The DSCP number is as defined in RFC 2474 of IETF (Internet Engineer Task Force). Unless otherwise noted, all RFCs cited herein refer to documents of the IETF and can be located at www.IETF.org/RFC.html. while the PHB number may follow the PHB identification code as defined in RFC 2836. |
| SLS Number | The SLS number is required if a measurement is conducted per-SLS such as a measurement of the EF traffic class or a throughput measurement. It is also needed for later analysis per SLS as well. Therefore, even if we perform a measurement per DSCP as mention earlier, an SLS number is still needed for later processing. |
| Test Number | The test number is the finest identifier. When an SLS requires multiple distinct measurements, a test number will be used to index such distinct test measurements. This number keeps increasing until it reaches a large number (the bound) before wrapping around. This bound must be large enough such that it is possible to match the output results (either the singletons or the samples) to the corresponding test correctly and without ambiguity. |

Table 2 illustrates the information needed for the test packet payload.

TABLE 2

TEST PACKET PAYLOAD

| | |
|---|---|
| Time stamp | The timestamp includes fields for the integer part and fractional parts of the time, an "S" field for identify whether the clock is synchronized to an external clock, and a precision field indicating the number of bits of the integer and fractional parts believed to be correct. |
| Sample Sequence Number | In order to distinguish test packets of various samples from the same test, a sample sequence number is attached. This number will be used later to produce an output record. Similar to the case of the test number, the counter for this sequence keeps increasing before wrapping around. It must be assured that such a bound is large enough to support a continual measurement throughout the SLS service schedule time. |
| Singleton Sequence Number | This singleton sequence number is to distinguished one test packet from another when both packets belong to the same measurement sample. Normally, it is a integer number, e.g., 1, 2, 3, . . . However, it may be coded into an appropriate format. |
| Additional Information | This is a space prepared for placing any necessary information. For examples, they can be any measurement parameter changing information such as a route change, a change in lambda, etc. To the extreme, it may even contain any management and control information |

The test packet size should be as short as possible to avoid packet fragmentation. When a performance metric is measured against a packet size, a variable packet size is required. In order to create a packet of a specific size, padding would be needed. However, the filling bits must be randomized to avoid any side effects. The size of a test packet can be varied according to various criteria: (1) increasing/decreasing order of size, (2) randomly generated size within a specific bound and (3) baseline or measurement-based packet size distribution. The test packet may be authenticated and encrypted for security purpose. The key generation and exchange system as well as the procedure may follow the AES (Advanced Encryption Standard) system.

Figure 3:
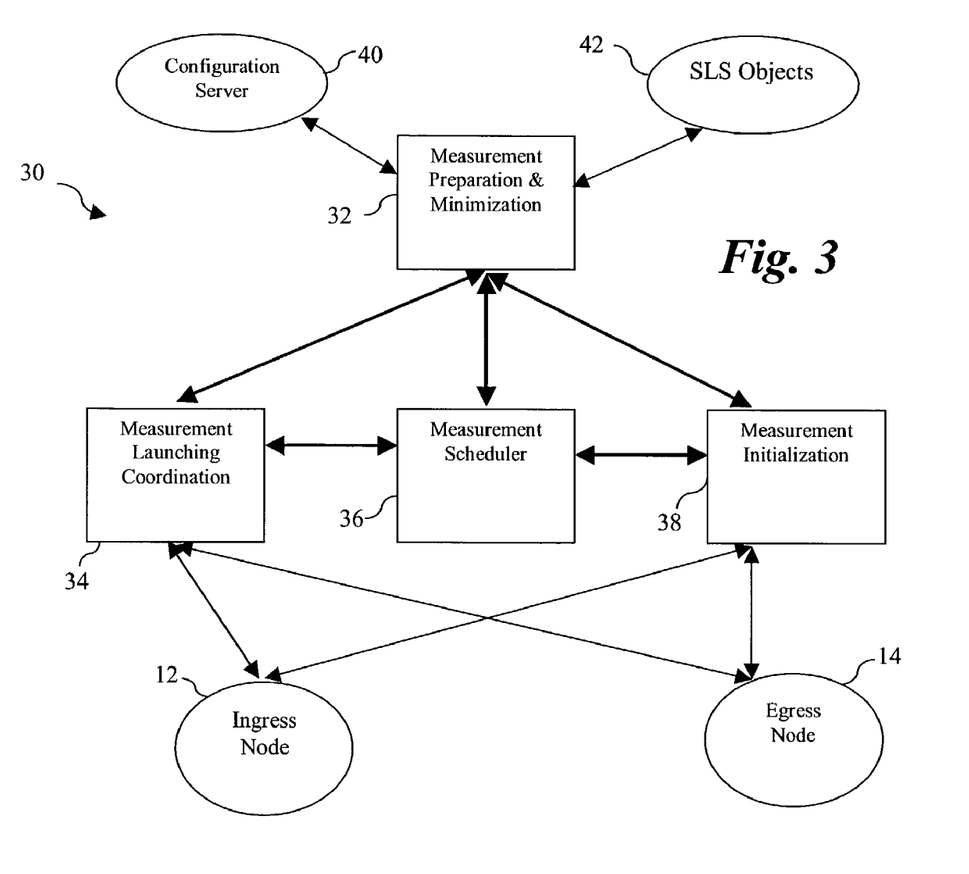
FIG. 3 illustrates a block diagram of a structure for decentralized SLS monitoring in a Differentiated Service network environment.

FIG. 3 illustrates a block diagram of a structure 30 for decentralized SLS monitoring in a Differentiated Service network environment. The decentralized SLS monitoring structure 30 includes a measurement preparation and minimization module 32, measurement launching coordination module 34, measurement scheduler module 36 and measurement initialization module 38. Configuration server 40 provides information regarding the test parameters for a given test and an SLS Objects database provides information on the SLS specification for a given SLA (service level agreement).

In operation, the measurement preparation and minimization module 32 scrutinizes an SLS specification to determine a number of one-way network performance measurements to be performed. Each one-way network performance measurement will be considered later for an appropriate configuration and a launching scheme. The measurement preparation and minimization module also provides a procedure to minimize a number of measurement sessions to only the ones necessary to be conducted. The information from the service characteristics and requirements specified in the SLS is used to group the SLS requests that share common features in deducing the minimization procedure. The measurement preparation and minimization module is discussed in greater detail in connection with FIGS. 4-7.

The measurement scheduler module 36 keeps track of on-going measurement activities. It maintains a number, type, and configuration of the one-way measurements to be conducted, as well as updates the measurement activity profile when there is a new measurement request or a measurement termination report. This module is discussed in greater detail in connection with FIGS. 8 and 9.

The measurement initialization module 38 dispatches information regarding measurement configuration and test packet specification to all entities involved in an underlying measurement activity. This module is discussed in greater detail in connection with FIG. 10.

The measurement launching coordination module 34 is responsible for a smooth and effective measurement operation by synchronizing a sending and receiving activities at both ending points of a measurement path. This module is discussed in greater detail in connection with FIG. 11.

Figure 4:
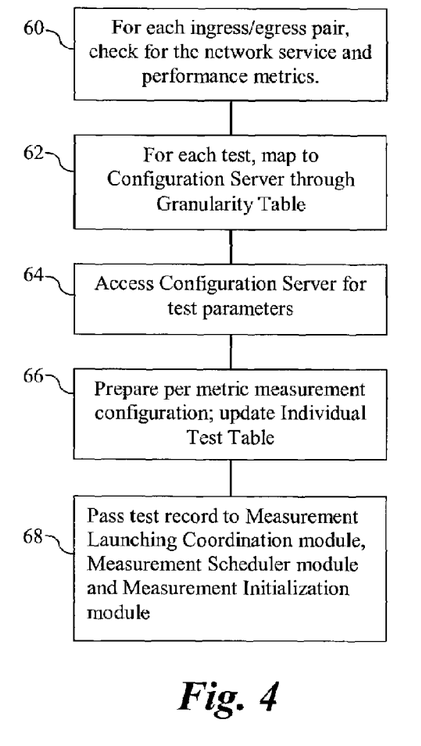
FIG. 4 is a flowchart for adding a new SLS.
Figure 5:
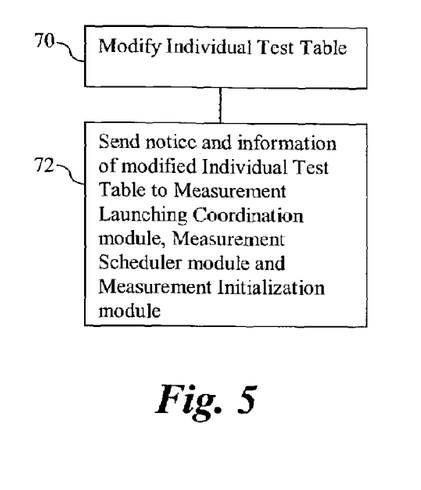
FIG. 5 is a flowchart for terminating an existing SLS.
Figure 6:
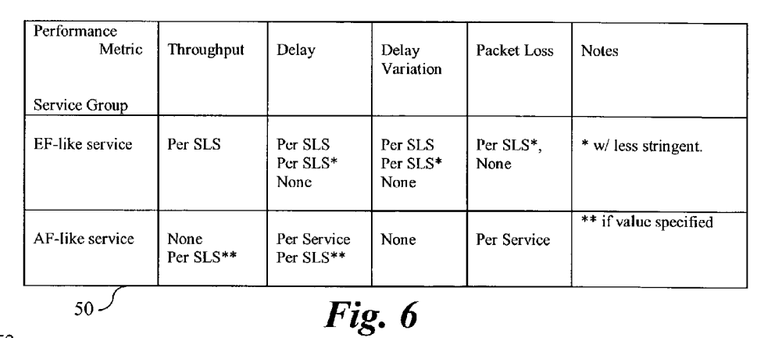
FIG. 6 illustrates a Performance Measurement Granularity Table ("Granularity Table")
Figure 7:
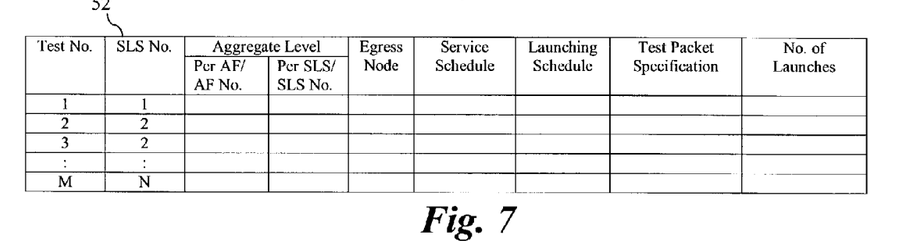
FIG. 7 illustrates a Per-Ingress Node Network Performance Metric Individual Test Table (hereinafter "Individual Test Table")

FIGS. 4-7 illustrate the operation of the measurement preparation and minimization module. FIG. 4 is a flowchart for adding a new SLS. FIG. 5 is a flowchart for terminating an existing SLS by the Measurement Preparation and minimization module 32. FIG. 6 illustrates a Performance Measurement Granularity Table (hereinafter, "Granularity Table") 50. FIG. 7 illustrates a Per-Ingress Node Performance Metric Individual Test Table (hereinafter "Individual Test Table") 52 that includes parameters for each test for each SLS.

Referring to FIG. 4, in step 60, the network service and performance metrics are determined. In step 62, the Granularity Table 50 is referenced to map the requirements of the new SLS to the test parameters in the Configuration Server 40. The Granularity Table 50 provides a list of variations for each test for both AF (Assured Forwarding) and EF (Expedited Forwarding) like services (a given SLS could have AF or EF specifications, or both). In general, in an AF-like service, resources are shared between users, while in a EF-like service, resources are allocated per user. Thus, in a given SLS, the Delay measurement could be specified as a per service (per DSCP) or per SLS. Each variation in the Granularity Table 50 maps to a different location in the Configuration Server 40.

In step 64, using the information form the Granularity Table 50, the Configuration Server 40 is accessed to obtain the test parameters for the measurement required by the SLS. In step 66, a measurement configuration is prepared for each specified metric, including packet specification, launching schedule, as well as a number of launches. The Individual Test Table 52 is updated with the new test parameters for the new SLS. In step 68, the test record is passed to the Measurement Launching Coordination module 34, Measurement Scheduler module 36 and Measurement Initialization module 38.

FIG. 5 illustrates a flow chart for terminating an SLS. In step 70, the Individual Test Table 52 is modified to reflect the terminated tests and in step 72, the change in test records is passed to the Measurement Launching Coordination module 34, Measurement Scheduler module 36 and Measurement Initialization module 38.

Figure 8:
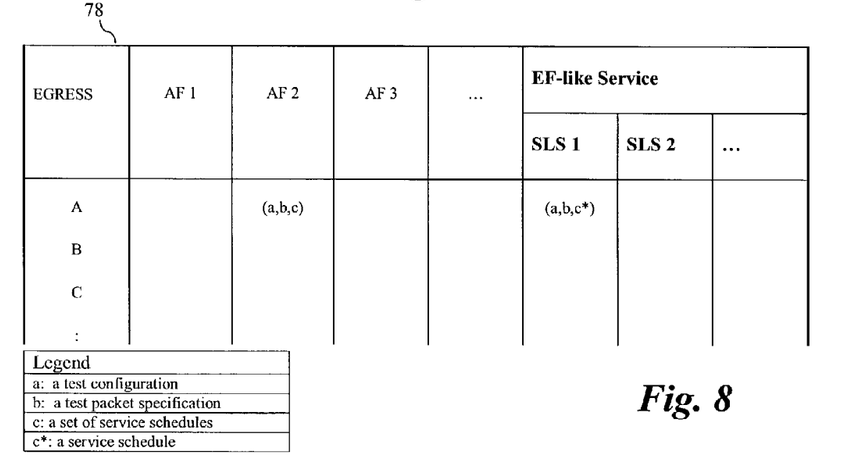
FIG. 8 illustrates a Measurement Activity Profile Table.

The Measurement Scheduler module 36 maintains a Measurement Activity Profile Table 78, shown in FIG. 8, that contains information about types of measurement activities and their details, to be performed at each ingress node. The Measurement Activity Profile Table 78 uses the information obtained in the Granularity Table 50 to consolidate the same type of measurements, thus minimizing the number of measurement activities. In addition, the Measurement Scheduler module 36 adjusts the measurement scheduling configuration in response to external changes and topological changes.

Figure 9:
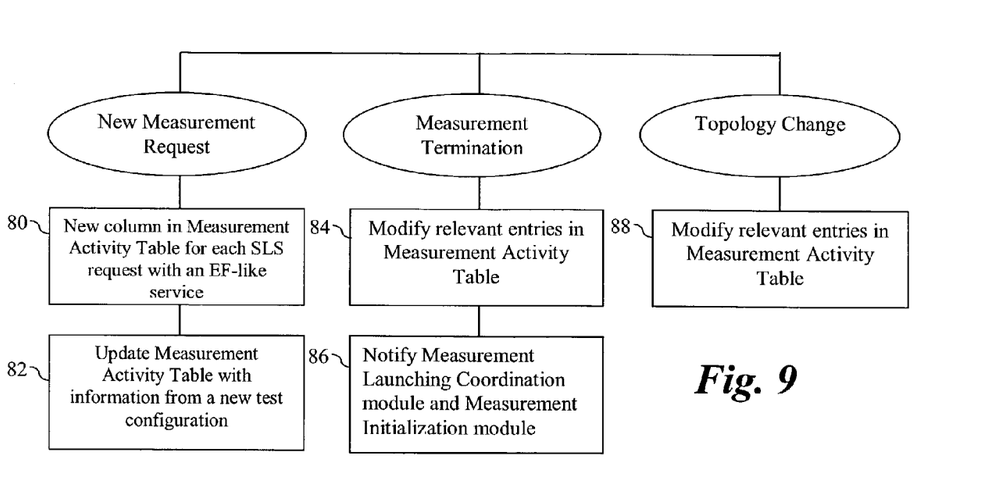
FIG. 9 illustrates a flow chart describing the maintenance of the Measurement Activity Profile Table.

FIG. 9 illustrates a flow chart describing the maintenance of the Measurement Activity Profile Table 78. In response to a new measurement request, a new column is provided in the Measurement Activity Table 78 for each SLS request with an EF-like service in step 80. In step 82, information regarding the request is placed within the new column.

In response to a measurement termination, relevant entries in the Measurement Activity Table 78 are modified in step 84. In step 86, the Measurement Launching Coordination module 34 and Measurement Initialization module 38 are notified of the modification.

In response to a topology change, relevant entries in the measurement Activity Table 78 are modified to reflect the change.

Figure 10:
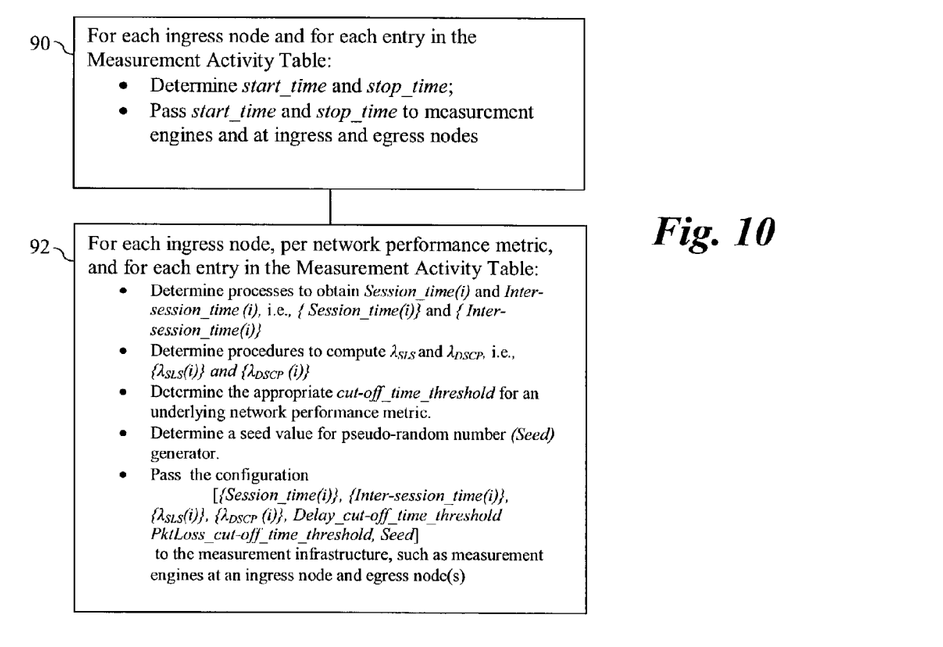
FIG. 10 is a flow chart illustrating the operation of the Measurement Initialization Module.

The Measurement Initialization Module 38 dispatches information regarding measurement configuration and test packet specification to all entities involved in an underlying measurement activity.

FIG. 10 is a flow chart illustrating the operation of the Measurement Initialization Module 38. In step 90, the measurement period is determined by setting start_time and stop_time for each ingress node and for each entry in the Measurement Activity Table 78. This information is passed to the measurement engines 16 and 18 at the ingress node 12 and egress node 14, respectively. In step 92, for each ingress node 12, per each network performance metric, and for each entry in the Measurement Activity Table 78, the Session_time(i), Inter-session_time(i), $\lambda_{SLS}(i)$, $\lambda_{DSCP}(i)$, Delay_cut-off_time_threshold ($\tau_{Delay}$), PktLoss_cut-off_time_threshold ($\tau_{Loss}$), and a Seed value (for use with a random number generation in launching the test packets) are determined. In addition, before a measurement starts, both measurement engines 16 and 18 for a ingress/egress node pair must be informed of the specification for the packet types.

After both measurement engines at an ingress node 12 and egress node 14 receive the measurement configuration, the next step is to coordinate pre-launching activities before a measurement test starts. This ensures that the measurement engine 18 at the egress node knows when its counterpart engine 16 at the ingress node will send packets so that it can prepare for the arrival of the test packets.

Figure 11:
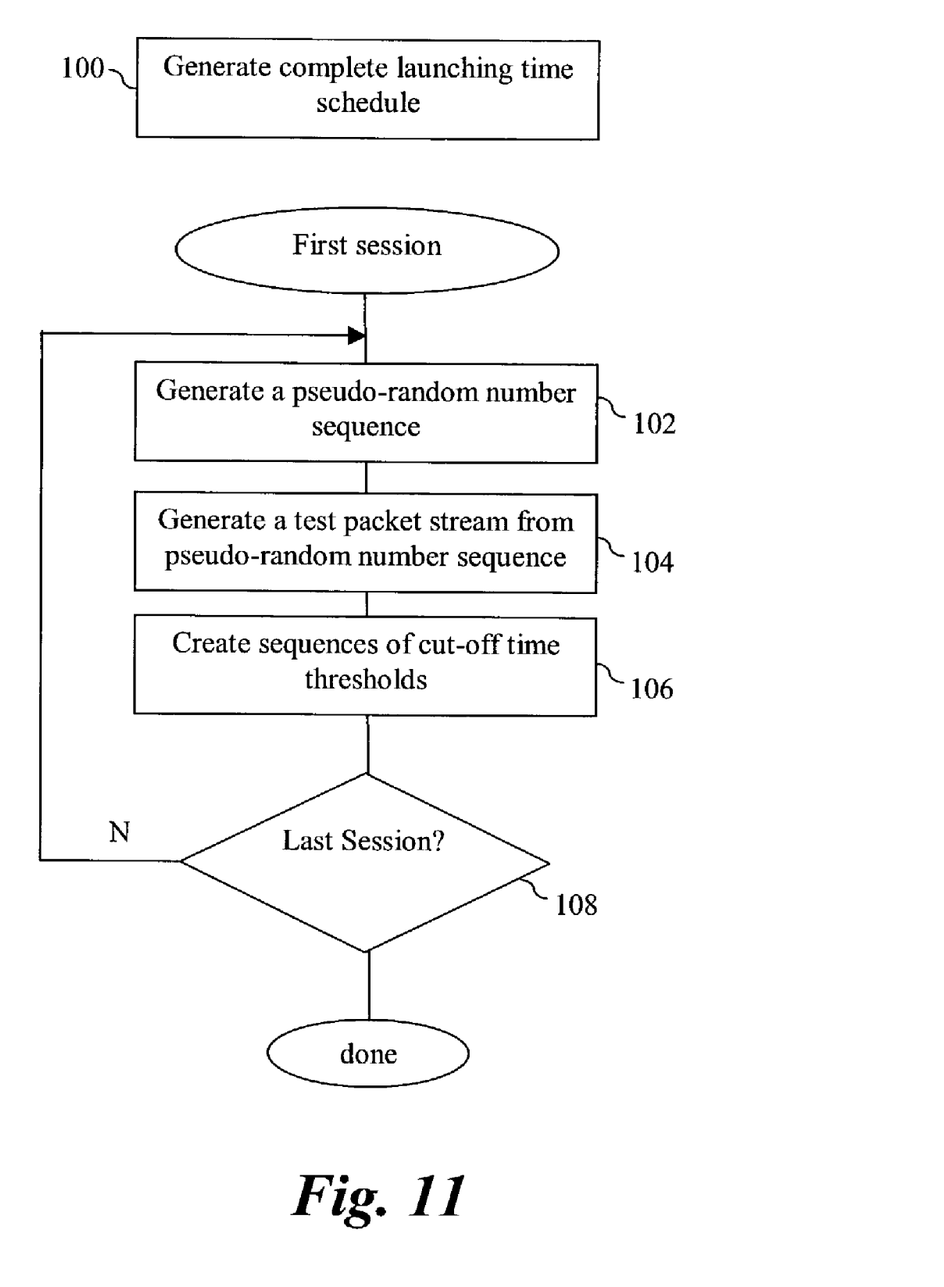
FIG. 11 is flow chart of measurement configuration by the Measurement Initialization Module.

FIG. 11 illustrates the steps taken by the Measurement Launching Coordination module 34 to set up a measurement test for launching. In step 100, a complete launching time schedule is generated. The launching time schedule provides a pattern of an order and length of the test sessions for the entire measurement process. It is determined from the provided start_time, the stop_time, a sequence of Session_time (i), and a sequence of Inter-session_time(i).

In step 102, a pseudo-random number sequence is generated in accordance with the agreed to Seed value. Two sides of the measurement path must agree upon on what type of a random number generator to be used. There are several types of the generators, for example, Linear Congruential Generators (LCGs), Tausworthe Generators, Extended Fibonacci Generators, and Combined Generators.

In step 104, a test packet stream is generated from the pseudo-random number sequence. Using Poisson distribution, the time elapsed between packets in the Poisson packet stream is an exponential distributed random number. For the $i^{th}$ session, we generate an exponential time interval (with an average $1/\lambda_i$) between adjacent test packets to create the corresponding Poisson stream (with an average $\lambda_i$).

In step 106, the cut-off times for the packets is generated. Given a sequences of test_packet_time(i,j):

$$\text{Delay\_cut-off}(i,j) = \text{test\_packet\_time}(i,j) + \text{Delay\_cut-off\_time\_threshold}$$

$$\text{PktLoss\_cut-off}(i,j) = \text{test\_packet\_time}(i,j) + \text{PktLoss\_cut-off\_time\_threshold}$$

The present invention provides significant advantages over the prior art. The solution described in connection with FIGS. 1-10 supports SLS monitoring a Differentiated Service Networks, offering an optimal and decentralized solution. The solution allows the tests for SLS monitoring to be prepared by a central structure, and then sent to the appropriate ingress/egress node pairs for execution without intervention. The central structure only needs to get involved if changes are made to the tests. Further, the preparation and initiation of multiple tests (delay, delay variation, packet loss) are handled by a single structure, rather than each being performed by a separate structure. The measurement activities are minimized while achieving effective and efficient measurements.

Although the Detailed Description of the invention has been directed to certain exemplary embodiments, various modifications of these embodiments, as well as alternative embodiments, will be suggested to those skilled in the art. For example, while the Measurement Launching Coordination module 34 and the Measurement Initialization module are shown separate from the ingress and egress nodes, it would be possible to all or some of this functionality into ingress and egress nodes. The invention encompasses any modifications or alternative embodiments that fall within the scope of the claims.

The invention claimed is:

1. A measurement system for measuring service level specification (SLS) performance criteria between a plurality of ingress and egress nodes, comprising:
a central structure for:
generating test parameters for a plurality of tests between ingress and egress node pairs;
passing the test parameters to the node pairs for execution on the node pairs without intervention of said central structure;
said central structure including:
a configuration database that includes test parameters for said performance criteria;
an SLS objects database that includes provides information on various SLS specification; and
a measurement preparation module that generates a measurement plan for each SLS specification.

2. The measurement system of claim 1 wherein said central structure further includes a measurement session module that analyzes one or more measurement plans generated by the measurement preparation module to reduce individual measurements that share common features.

3. The measurement system of claim 2 wherein said central structure further comprises a measurement scheduling module that maintains scheduling for each measurement plan.

4. The measurement system of claim 2 wherein said central structure further comprises a measurement initialization module that transmits control information to each egress node involved in a measurement plan, wherein the control information includes information on measurement session scheduling, configuration and test packet specifications.

5. The measurement system of claim 2 wherein said central structure further comprises a measurement launching coordination module that synchronizes sending and receiving of test packets between pairs of ingress and egress nodes during each measurement session.

6. The measurement system of claim 1 wherein said plurality of tests include delay and delay variation tests.

7. The measurement system of claim 1 wherein said plurality of tests include a packet loss test.

8. A method of measuring service level specification (SLS) performance criteria between a plurality of ingress and egress nodes, comprising the steps of:
generating test parameters for a plurality of tests between ingress and egress node pairs in a central structure;
passing the test parameters form the central structure to the node pairs for execution on the node pairs without intervention of said central structures,
said generating test parameters including:
accessing test parameters from a configuration database;
access an SLS objects database that includes providing information on various SLS specifications; and
generating a measurement plan for each SLS specification.

9. The method of claim 8 and further comprising the step of analyzing one or more measurement plans to reduce individual measurements that share common features.

10. The method of claim 9 and further comprising the step of maintaining scheduling for each measurement plan measurement scheduling module.

11. The method of claim 9 wherein said passing step comprising the step of transmitting control information to each egress node involved in a measurement plan, wherein the control information includes information on measurement session scheduling, configuration and test packet specifications.

12. The method of claim 9 and further comprising the step of synchronizing sending and receiving of test packets between pairs of ingress and egress nodes during each measurement session.

13. The method of claim 8 wherein said plurality of tests include delay and delay variation tests.

14. The method of claim 8 wherein said plurality of tests include a packet loss test.

* * * * *